(12) United States Patent
Phadke

(10) Patent No.: US 6,714,429 B2
(45) Date of Patent: Mar. 30, 2004

(54) ACTIVE INRUSH CURRENT CONTROL FOR AC TO DC CONVERTERS

(75) Inventor: Vijay Gangadhar Phadke, Pasig (PH)

(73) Assignee: Astec International Limited, Kwun Tong (HK)

(*) Notice: Subject to any disclaimer, the term of this patent is extended or adjusted under 35 U.S.C. 154(b) by 0 days.

(21) Appl. No.: 10/215,867

(22) Filed: Aug. 9, 2002

(65) Prior Publication Data

US 2003/0035311 A1 Feb. 20, 2003

Related U.S. Application Data

(63) Continuation-in-part of application No. 09/930,818, filed on Aug. 15, 2001, now Pat. No. 6,493,245.

(51) Int. Cl.[7] ............................................. H02M 7/217
(52) U.S. Cl. ......................... 363/89; 323/222; 323/908
(58) Field of Search ............................... 323/222, 908; 363/89

(56) References Cited

U.S. PATENT DOCUMENTS

| | | | |
|---|---|---|---|
| 4,161,022 A | 7/1979 | Kanazawa et al. | 363/88 |
| 4,218,728 A | 8/1980 | Chambers et al. | 363/87 |
| 4,233,558 A | 11/1980 | Gaertner | 363/88 |
| 4,315,305 A | 2/1982 | Siemon | 363/88 |
| 4,376,968 A | 3/1983 | Wueschinski et al. | 363/88 |
| 4,620,296 A | 10/1986 | Siemon | 363/37 |
| 4,729,082 A | 3/1988 | Sato | 363/88 |
| 4,811,189 A | 3/1989 | Harvest et al. | 363/88 |
| 4,864,482 A | 9/1989 | Quazi et al. | 363/37 |
| 5,202,819 A | 4/1993 | Min | 363/86 |
| 5,420,780 A | 5/1995 | Bernstein et al. | 363/89 |
| 5,715,154 A | 2/1998 | Rault | 363/89 |
| 5,822,203 A | 10/1998 | Peron | 323/908 |
| 5,930,130 A * | 7/1999 | Katyl et al. | 363/89 |
| 5,995,395 A | 11/1999 | Rivet | 363/88 |
| 6,163,712 A | 12/2000 | Winkler et al. | 323/908 |
| 6,222,749 B1 | 4/2001 | Peron | 323/908 |
| 6,320,357 B1 * | 11/2001 | Peters et al. | 323/222 |
| 6,445,165 B1 * | 9/2002 | Malik et al. | 323/908 |
| 6,493,245 B1 | 12/2002 | Phadke | 323/908 |
| 6,614,668 B2 * | 9/2003 | Coffey et al. | 323/222 |

* cited by examiner

Primary Examiner—Jeffrey Sterrett
(74) Attorney, Agent, or Firm—Coudert Brothers LLP

(57) ABSTRACT

The present invention provides for an apparatus and corresponding method for controlling inrush current in an AC-DC power converter by providing a control circuit to limit inrush current efficiently during cold startup, warm startup, and power line disturbance conditions. The present invention controls inrush current without the need for an extra series lossy dissipative device and without causing undesirable voltage surges at the input of the DC—DC converter stage. The preferred embodiment includes use of the present invention for AC-DC converters having active power factor correction.

13 Claims, 8 Drawing Sheets

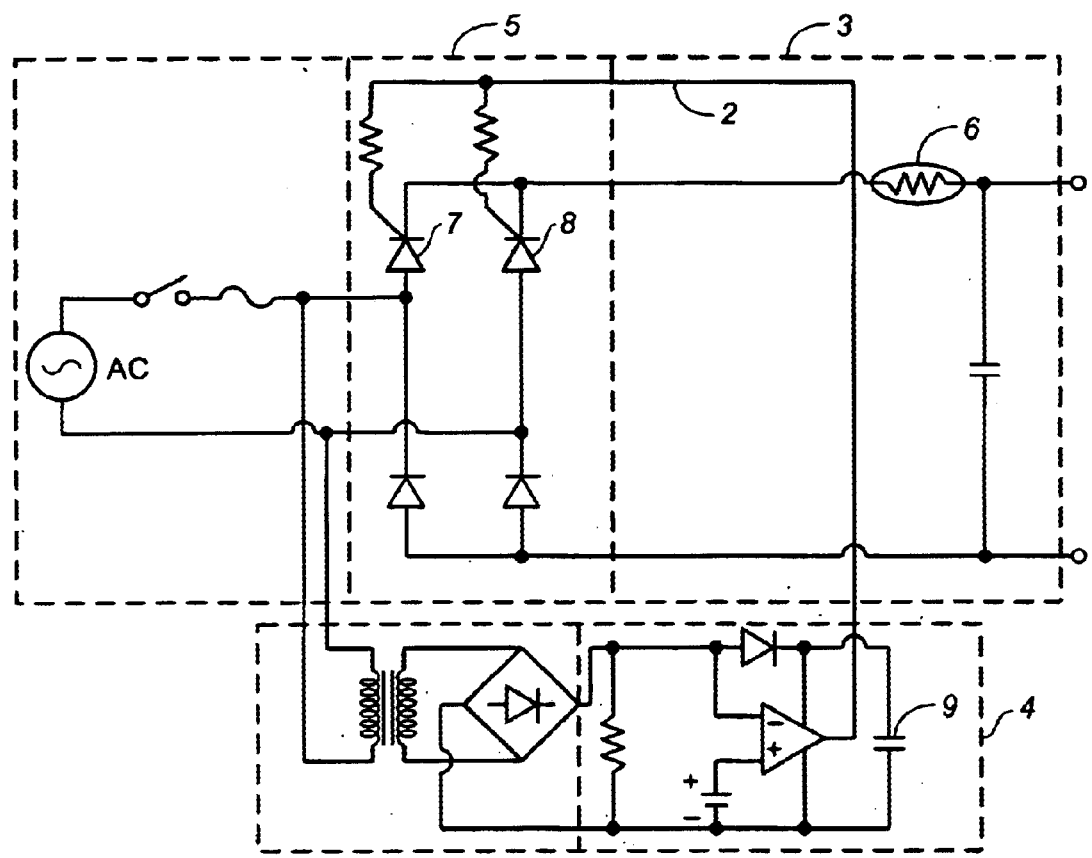
FIG._1A (PRIOR ART)
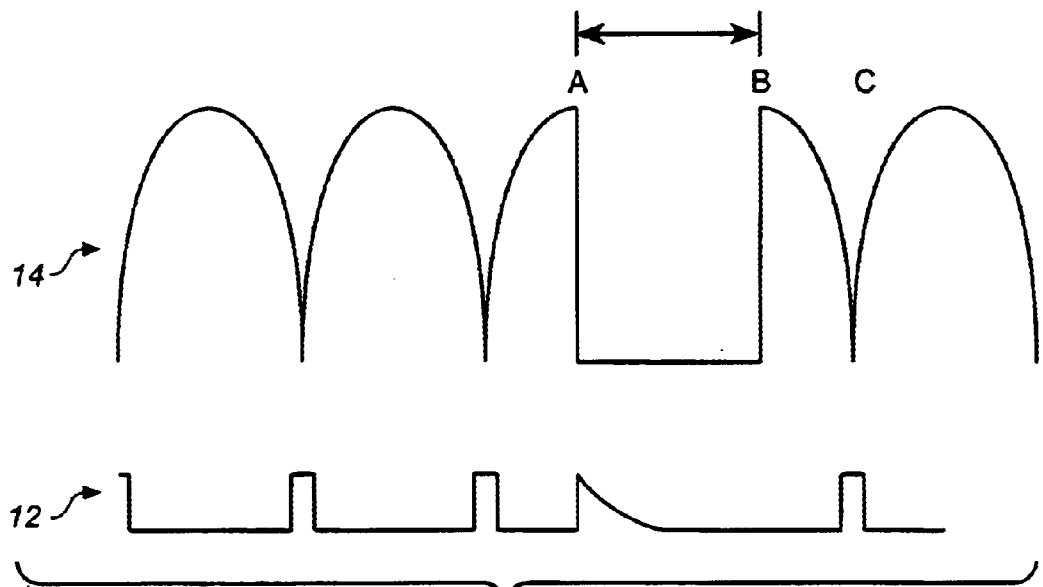
FIG._1B (PRIOR ART)

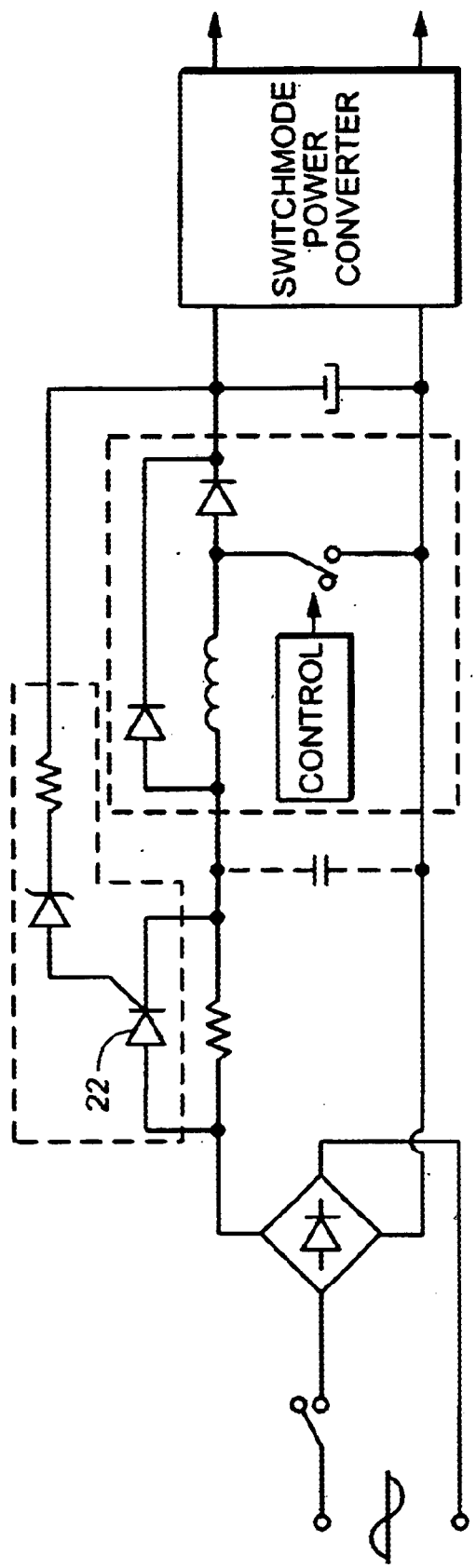
FIG._2 (PRIOR ART)

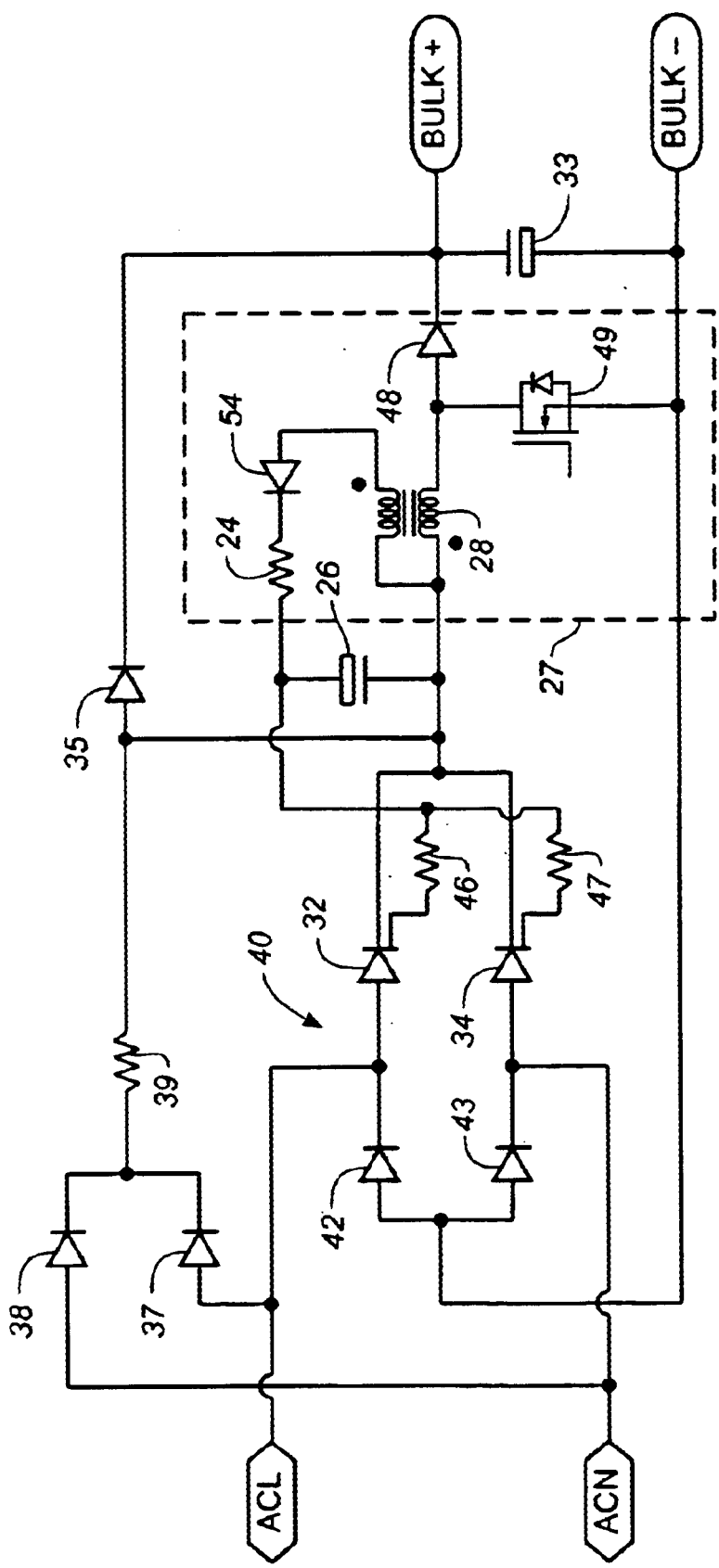
FIG._3 (PRIOR ART)

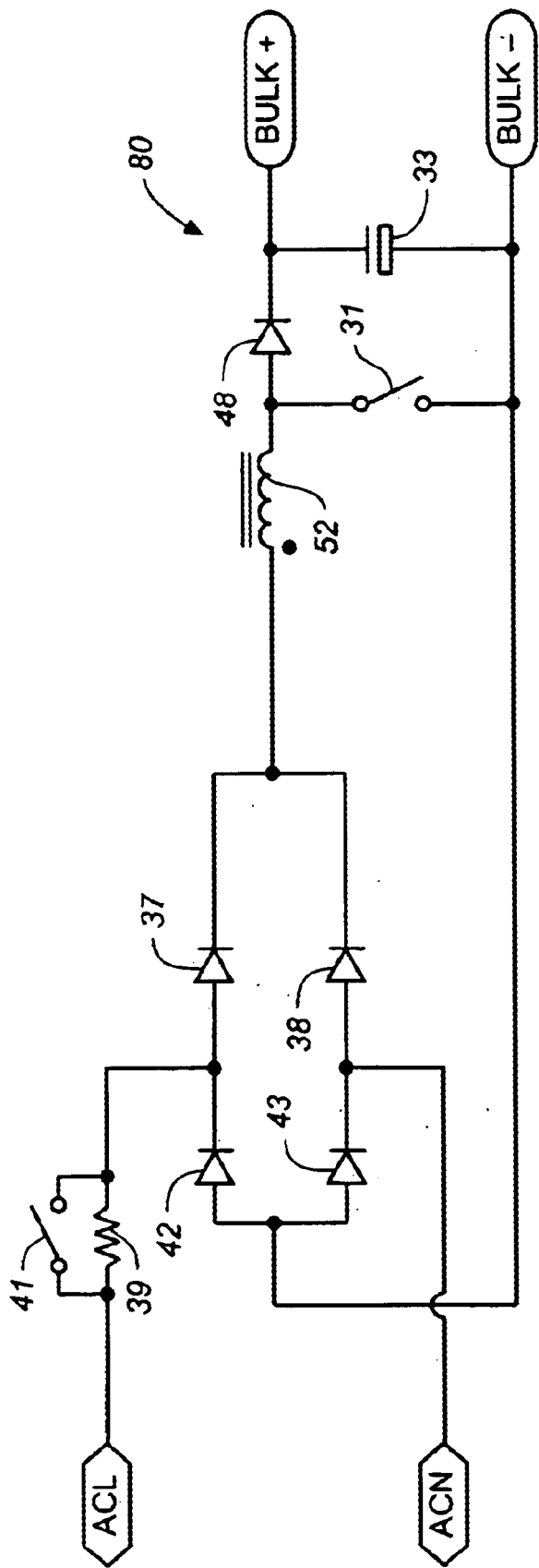
FIG._4 (PRIOR ART)

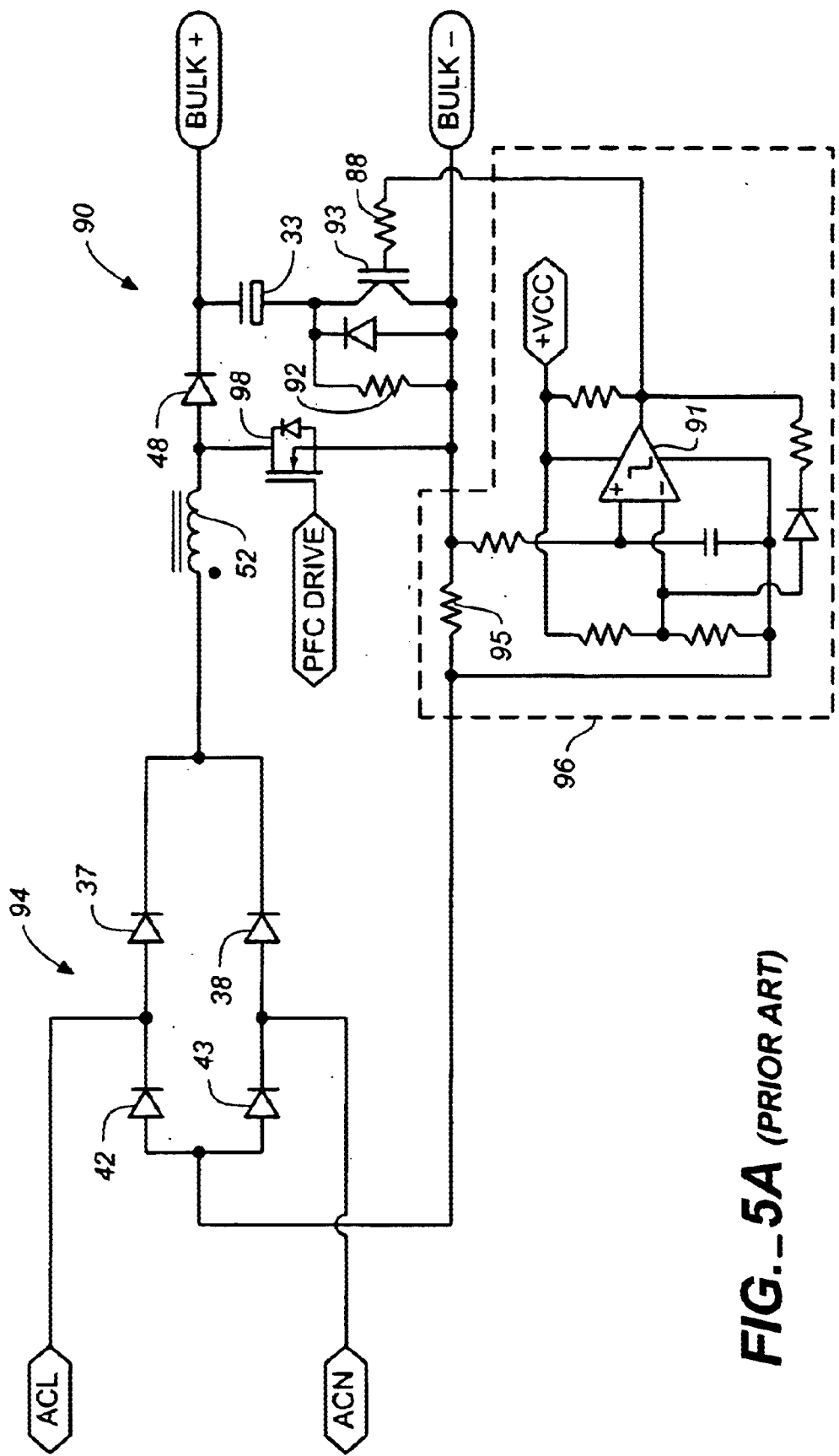
FIG._5A (PRIOR ART)

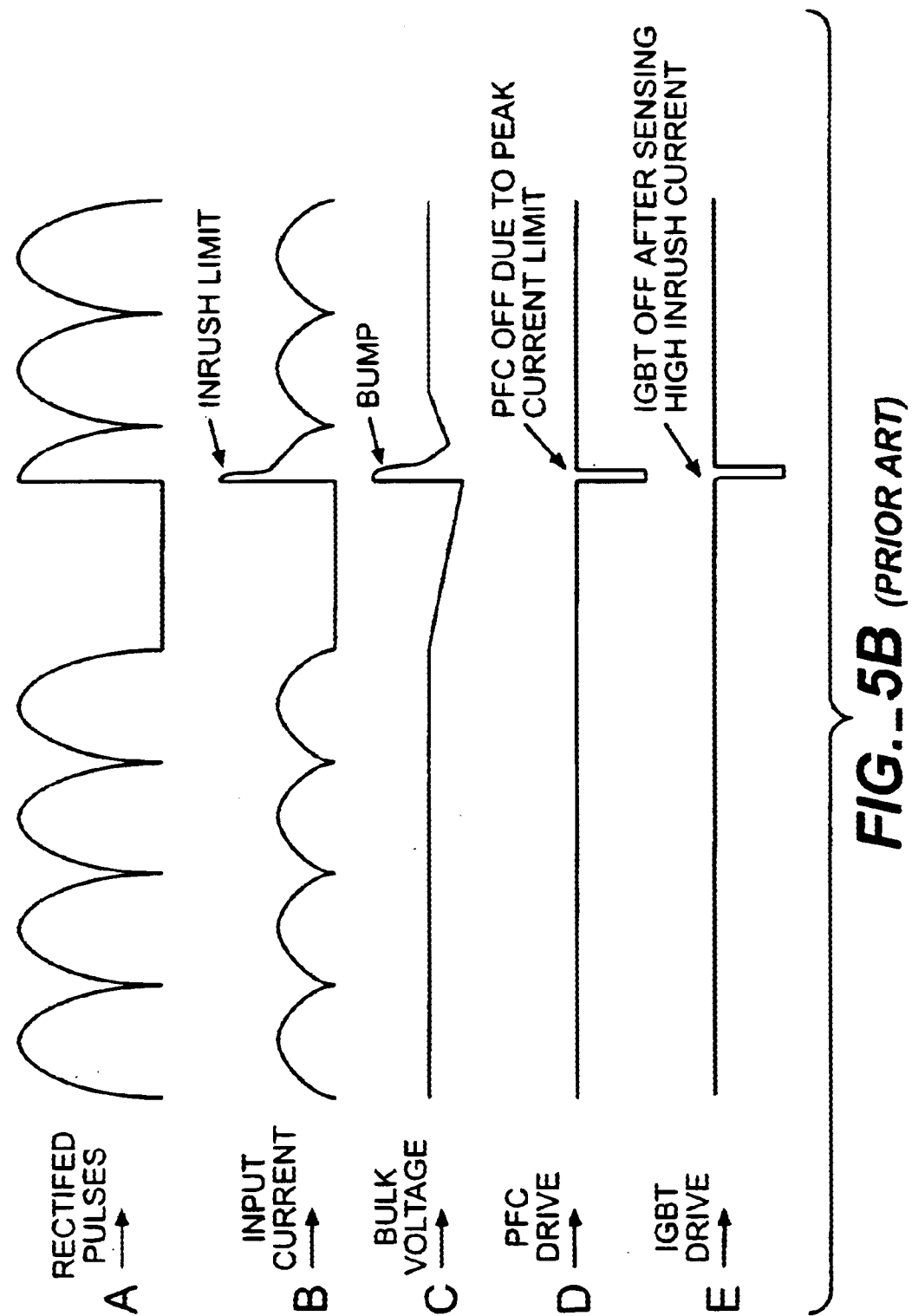
FIG._5B (PRIOR ART)

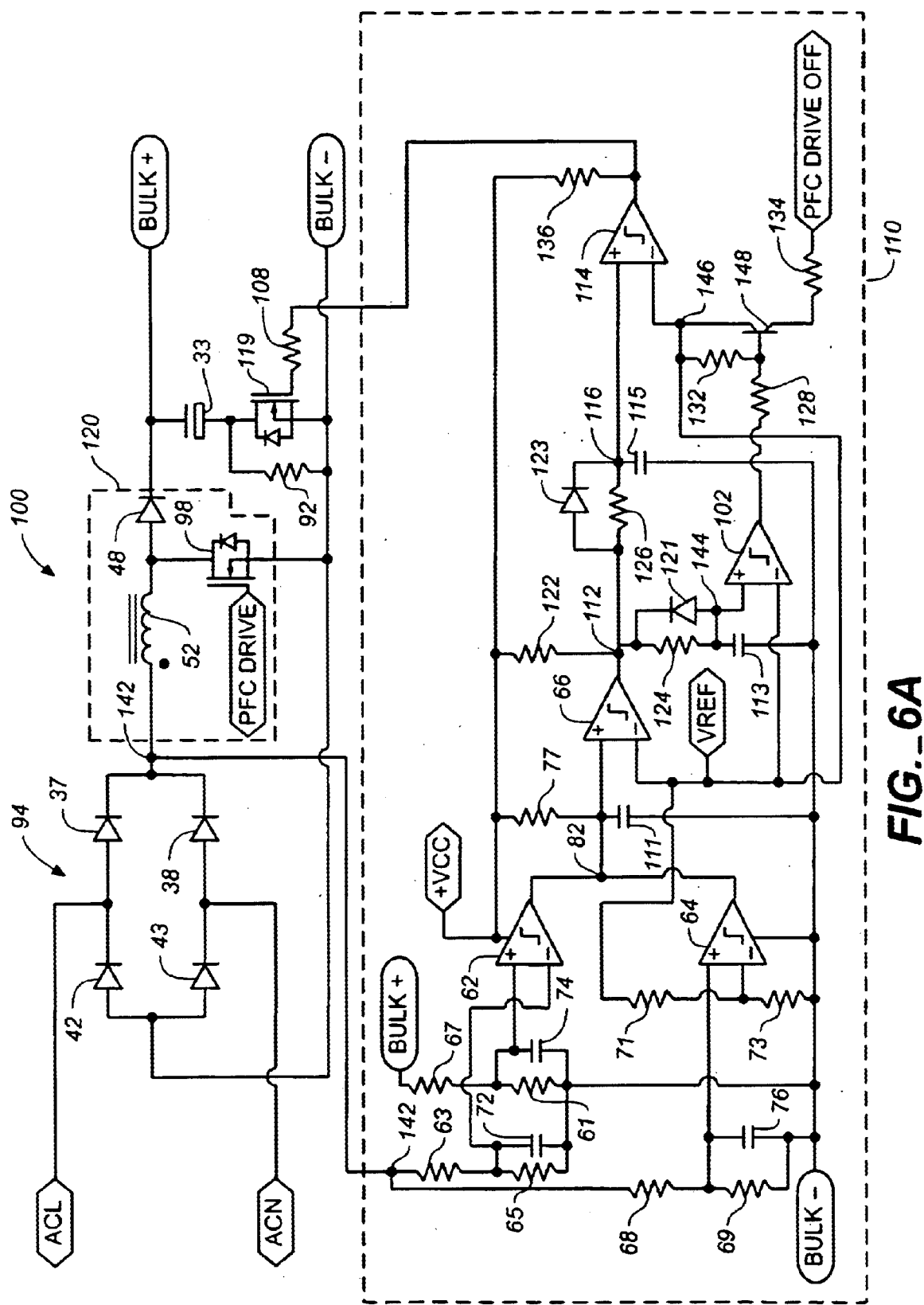
FIG._6A

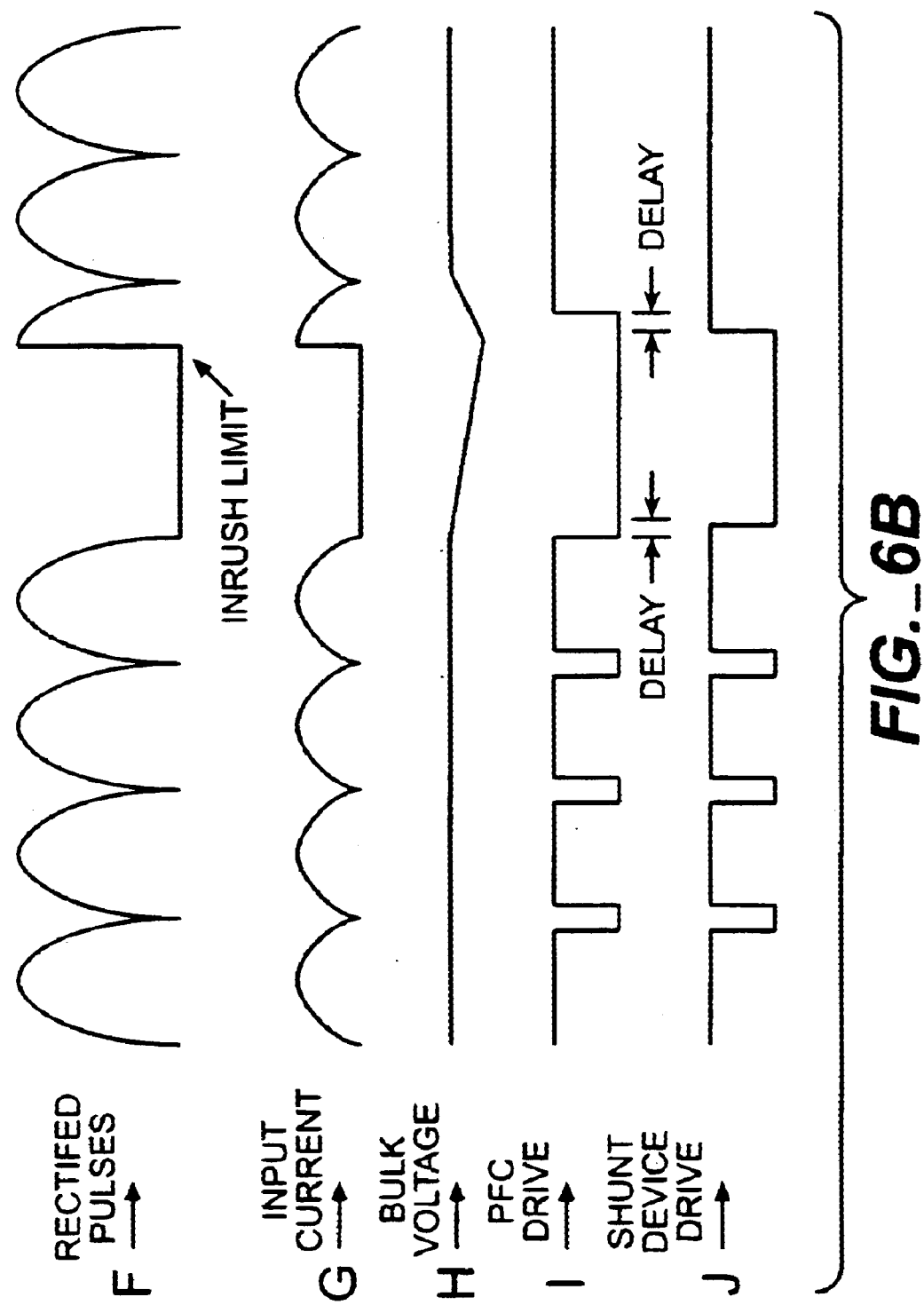
FIG._6B though the circuit of FIG. 3 can control inrush current
ACTIVE INRUSH CURRENT CONTROL FOR AC TO DC CONVERTERS

CROSS REFERENCES TO RELATED APPLICATIONS

This application is a continuation-in-part of application Ser. No. 09/930,818, filed Aug. 15, 2001, entitled "Method And Apparatus For Inrush Current Control For AC To DC Converters", now U.S. Pat. No. 6,493,245.

FIELD OF INVENTION

The present invention relates to controlling inrush current in a power supply, and more particularly, to circuitry for controlling inrush current efficiently during cold startup, warm startup and power line disturbance conditions.

BACKGROUND OF THE INVENTION

The control of inrush current is especially important in N+1 redundant power systems. If excessive inrush current blows a fuse or trips the main circuit breaker on an AC distribution board, then the redundancy of the entire system is lost, even if the power supply is still functioning properly. The inrush current requirements of modern power supplies are very stringent, demanding efficient control of inrush current even during abnormal power line disturbances and for high current applications.

To control inrush current, conventional methods may employ a relay, a negative temperature coefficient (NTC) thermistor, thyristor or similar switch, often in combination with a resistor or thermistor, in an attempt to limit inrush current in an AC-DC power supply. As is known in the art, an NTC thermistor is a component with a resistance that decreases as its temperature increases. During power supply startup, the temperature of the thermistor is cold and its resistance high, a characteristic that can be used to limit inrush current. As the power supply continues to operate, the temperature increases and the resistance of the thermistor decreases, thereby allowing more current during normal operation.

FIG. 1A illustrates a prior art method and circuit disclosed in U.S. Pat. No. 5,202,819 to Min that includes a thermistor for controlling inrush current. Although the disclosed method provides inrush current control, it has major drawbacks. One drawback is that a Thermistor 6 in smoothing circuit 3 is always present as a series element, resulting in power dissipation proportional to the input current. This method is therefore inefficient especially for high current applications. In addition, if a power line disturbance (PLD) occurs during operation, the hot thermistor will be functioning at low resistance and so will not limit inrush current effectively. Thus, to prevent inrush current caused by the PLD, some delay must be built in to first allow the thermistor to cool or a circuit provided that bypasses the thermistor, in order to control inrush current.

Another drawback of the prior art circuit shown in FIG. 1A is that it uses a "Near Zero Crossing" detection for triggering two silicon controlled rectifiers (SCRs) 7,8 in the phase control rectifying circuit 5. An SCR is a device which is normally non-conducting, with conduction initiated by application of a gate current. The SCR will remain ON (i.e., conducting) until current flowing in the SCR is reduced to some minimum level. If AC power fails at a non zero phase angle, slightly higher than sensed for "Near Zero Crossing", and recovers at the same angle after a period of one cycle, the control circuit 4 in FIG. 1A will wait for the next near zero crossing, after nearly another half AC cycle, before triggering the SCRs 7,8. A larger bulk capacitor 9 will be required to provide energy during such a power line disturbance, even when AC is restored. The result is a circuit that costs more and that has increased space requirements.

FIG. 1B shows a timing diagram that illustrates this drawback of the prior art circuit of FIG. 1A. The SCR gate drive signal waveform 12 shows the SCR gate drive pulses that occur at near zero phase angle. When AC fails at a non-zero phase angle, as shown in the Rectified Pulses waveform 14 at point A, the SCR gate drive signal 2 will stay ON as long as energy is available on capacitor 9. If capacitor 9 has too much energy, however, there is a possibility that, due to circuit delays, the SCRs 7,8 will trigger when AC restores at point B. This would result in heavy inrush current. If the charge on capacitor 9 decays, then the SCR's gate drive signal 2 is unavailable at point B for nearly one half cycle, upon restoration of AC power, until another zero crossing occurs at point C. As mentioned above, this problem forces use of a bigger bulk capacitor to maintain charge during the hold up period.

Another prior art method of inrush current control is disclosed in U.S. Pat. No. 5,715,154 to Rault, and shown in FIG. 2. This method has a drawback of including an extra series switch, Thyristor, 22. This extra switch will dissipate additional power; the dissipation being proportional to the input current. Thus, this method has the drawback of being very inefficient, especially for higher power applications, resulting in higher cost and the need for space-consuming heat sinking due to the increased dissipation.

FIG. 3 illustrates another conventional circuit for inrush current control. The circuit of FIG. 3 provides some inrush current control but has the drawback of not providing control during power line disturbance conditions. Modern power supply applications demand controlled inrush current even during power line disturbances that result in lost AC power. At power start up, both SCR 32 and SCR 34 in the bridge rectifier 36 shown in FIG. 3 are in the OFF state due to a lack of gate drive voltage. The initial inrush current flows through elements diode 37, diode 38, resistor 39, and diode 35 into a bulk capacitor 33 at the output of the circuit. The amount of inrush current can be kept below a desired value by choosing an appropriate value for limiting resistor 39. In operation, the Power Factor Control (PFC) boost regulator 27 starts operating by drawing power through diode 37, diode 38, and resistor 39. Bias voltage is induced in the secondary winding on the boost choke 28 due to the switching action of the boost switch 49. This induced bias voltage drives the SCRs 32,34 At that point, all power is delivered through the diode-SCR bridge.

Although the circuit of FIG. 3 can control inrush current satisfactorily for hot or cold start up conditions, the circuit has the drawback of not providing the inrush current control demanded by present generation power supplies when power line disturbances occur. Assuming an operating condition when a DC—DC converter (not shown) coupled to the output is already active and drawing power from the PFC boost regulator 27 at a low line voltage, e.g., 90V AC. If a power line disturbance occurs causing a missing AC cycle, bulk capacitor 33 at the output can continue to deliver power to the DC—DC converter during this "hold up" period. If capacitor 26 is small and cannot hold sufficient charge for driving the SCRs 32,34 during this hold up period, and if AC is restored in a time interval slightly less than the hold up time; then PFC boost regulator 27 will start switching immediately through diode 37, diode 38, and resistor 39 with most of the voltage dropped in resistor 39. This will require a longer time to generate the required gate drive for the SCRs 32,34, which results in depletion of the charge on capacitor 33. Alternatively, if capacitor 26 is made sufficiently large, the depletion problem can be solved, as the SCRs 32,34 will remain ON and can then support the required power levels of the DC—DC converter. The circuit of FIG. 3 does, however, have the drawback of not controlling inrush current at high line voltage during a power line disturbance condition. If an AC cycle is missed in a high line voltage condition, capacitor 33 will deliver the hold up power and the voltage across it will drop accordingly. In this case, the SCRs 32,34 are kept ON due to the charge available on capacitor 26. Under this condition, restoration of AC at the 90 degree phase angle and peak of 264V AC results in an undesirably large inrush current. Thus, under power line disturbance conditions, the conventional method and circuit in FIG. 3 does not control inrush current satisfactorily.

FIG. 4 illustrates another known power supply circuit 80 for inrush current control. When AC voltage is applied at the input of the power supply shown in FIG. 4, initial inrush current passes through the series resistor 39 and the bulk capacitor 33 at the output of circuit 80 is charged. After capacitor 33 is charged, resistor 39 is shunted by a switch 41 to control inrush current in this AC-DC power supply. Switch 41 shown in FIG. 4 is typically a relay or thyristor or other suitable electromechanical or semiconductor device switch. Although the circuit 80 of FIG. 4 can control inrush current satisfactorily for cold start up conditions, the circuit 80 has the drawback of not providing the inrush current control demanded by current generation power supplies when power line disturbances occur. A logic control circuit could be added to circuit 80 in an attempt to provide such inrush control. The circuit 80 of FIG. 4, however, has another drawback. If an electromechanical relay is used for switch 41, although it results in a power loss which is small, its response time would be undesirably slow. This slow response time of switch 41 would result in a circuit 80 that may not provide the inrush current control demanded by present generation power supplies during operating conditions. If a thyristor or other semiconductor switch is used for switch 41, it would have the opposite problem. The resultant power dissipation would be unacceptably high since switch 41 conducts the entire input current due to its location in the circuit 80 of FIG. 4.

FIG. 5A depicts another known power supply circuit 90 for inrush current control. The circuit 90 senses the inrush current through the voltage drop across the PFC Boost converter current sense resistor 95. At initial power on, the entire controlled inrush current will pass through the diodes 37, 38, 42 and 43 of bridge rectifier 94, inductor 52, diode 48, a bulk capacitor 33 and inrush limit resistor 92. Alternatively, a bypass diode (not shown) is connected across the series combination of inductor 52 and diode 48 to avoid saturation of inductor 52. Soon after initial power on, an internal auxiliary converter (not shown) starts up and generates the bias voltage Vcc for the control circuit 96 of FIG. 5A. Comparator 91 enables a shunt switch 93 to turn ON only when the current in resistor 95 is below a certain predetermined value. The shunt switch 93 can be an IGBT (Insulated Gate Bipolar Transistor) or other suitable transistor. Whenever AC cycles are missed in operating conditions due to power line disturbances, control circuit 96 causes switch 93 to turn off. The bulk capacitor 33 will continue to discharge to hold up the bulk output voltage being fed to the DC—DC converter (not shown) during this hold up period. Upon restoration of AC, a high inrush current can flow if the peak of the AC voltage is greater than the bulk voltage at that point. When this inrush current flows and exceeds the limit set in the logic circuit, switch 93 turns off very quickly and the series resistor 92 limits the inrush current.

Circuit 90 has major drawbacks, however, during certain operating conditions. For example, one such operating condition would be where there are missing AC cycles and the AC voltage recovers at a 90 degree phase angle near its peak. FIG. 5B is a timing diagram illustrating the timing for the circuit of FIG. 5A for this operating condition. For FIG. 5B, Trace A represents the rectified AC pulses; Trace B is the input current; Trace C is the bulk output voltage; Trace D is the "PFC Drive" signal; and Trace E is the gate drive signal for IGBT switch 93. In operation, the bulk output voltage for circuit 90 would be already at a much lower level than that of the peak AC voltage. The internal auxiliary voltage Vcc would still be available and be regulated. As a result, the PFC Drive circuit for circuit 90 is ready to switch power switch 98 at any time whenever the AC voltage is restored. Where AC restores at the condition described above, a high inrush current passes through the bulk capacitor 33 and, at the same time, the PFC Drive signal switches power switch 98 and the inductor 52 stores energy.

At this stage, the control circuit 96 of FIG. 5A senses a high input current through resistor 95 and turns off switch 93. In FIG. 5B, Trace B shows the input current reaching the inrush limit and Trace E shows switch 93 being turned off after sensing the high inrush current. In the meantime, switch 98 has already started switching and energy is stored in inductor 52. During the off period of switch 98, inductor 52 had been discharging into the load and at the same time charging the bulk capacitor 33. This current which had been charging the bulk capacitor 33 now suddenly sees a higher impedance when switch 93 turns off due to inrush resistor 92. Since the inductor 52 is in continuous mode during this time, it will try to pump constant current even through this higher resistance provided by inrush resistor 92. As a result, a voltage equal to the current multiplied by the resistance of resistor 92, is superimposed on the bulk capacitor 33 as a surge or "bump" (seen on Trace C in FIG. 5B). In many conditions, this surge has been observed to reach 600V in peak value, exceeding the ratings of the boost converter MOSFETs. Thus, one drawback of the technique in circuit 90 of FIG. 5A is that this circuit first allows a fault condition of higher inrush current to occur and then tries to prevent it, resulting in an undesirable voltage surge.

What is needed is a reliable and efficient circuit and corresponding method for providing the inrush current control demanded by current generation power supplies during hot and cold startup conditions and when power line disturbances occur.

SUMMARY OF THE INVENTION

The present invention solves the problems of prior art devices by providing a circuit and corresponding method which provides control to limit inrush current during cold startup, hot startup and power line disturbance conditions in AC to DC converters. The circuit of the present invention can be used for AC to DC converters with active power factor correction circuitry.

Broadly stated, the present invention provides an AC to DC power converter having active inrush current control during operational and power disturbance conditions, the converter having two input terminals to which AC power is coupled and two output terminals where the output DC power is provided, comprising an input rectifier for generating a rectified input voltage from a source of the AC power; a boost converter coupled to the rectifier for converting the input voltage to a DC voltage, the boost converter having a first switch, an inductor, and a first diode; an output capacitor connected to a first one of the DC output terminals; a resistor connected in series between the output capacitor and a second one of the DC output terminals; a second switch having a control input and being connected in parallel with the resistor; a control circuit for controlling inrush current, the control circuit being operatively connected to the control input of the second switch, comprising a comparator circuit for comparing the AC input and DC output voltages of the converter for causing the second switch to enter a conduction state when the AC input voltage exceeds a predetermined threshold and the AC input voltage is less than the DC output voltage.

The present invention broadly stated also provides a method of controlling inrush current in a AC-DC converter when AC power is lost during power line disturbance conditions, wherein the AC to DC converter is coupled between two input terminals to which AC power is coupled and two output terminals where the DC output voltage is provided, the AC-to DC converter including a boost converter controlled by a first switch, the AC to DC converter having connected across the output terminals a capacitor connected in series with the combination of a limiting resistor connected in parallel with a second switch, comprising the steps of maintaining a second switch in an off state to enable said limiting resistor to limit inrush current when said AC power is lost for a predetermined time interval; comparing the instantaneous AC input voltage to the DC output voltage of the converter; comparing the instantaneous AC input voltage to a predetermined voltage level to determine if the AC input voltage is present and non-zero; and triggering said second switch to the on state to shunt said limiting resistor when said AC power is restored to said predetermined level and the instantaneous input AC voltage is less than the DC voltage at the output of the AC-DC converter, such that inrush current is controlled and voltage surges at said DC output terminals are eliminated.

Consequently, the circuit and corresponding method of the present invention have the advantage that inrush current is controlled for hot startup and cold startup conditions, and even when power line disturbance conditions occur and provide the required control without undesirable voltage surges at the output.

Still another advantage of the present invention is that there is no need for an extra series dissipative device, and its consequent additional losses. For the present invention since the inrush current limiting resistor and the device which shunts it are placed in series with the bulk capacitor, the current stress is the same as for the bulk capacitor. This stress is much smaller than the input current. Thus, the dissipation is lower compared to placing the device in series with the input as in the known methods.

BRIEF DESCRIPTION OF THE DRAWINGS

The forgoing aspects and the attendant advantages of the present invention will become more readily appreciated by reference to the following detailed description, when taken in conjunction with the accompanying drawings, wherein:

FIG. 1A shows a prior art circuit that includes a thermistor for controlling inrush current.

FIG. 1B shows a timing diagram illustrating a drawback of prior art circuit of FIG. 1.

FIG. 2 depicts another prior art method of inrush current control that includes an extra series dissipative switch.

FIG. 3 illustrates another prior art circuit that provides some control of inrush current at startup but not during power line disturbances.

FIG. 4 shows a prior art circuit that includes a switch at the input for controlling inrush current.

FIG. 5A depicts another prior art method of inrush current control that includes a logic circuit for inrush current control.

FIG. 5B is a timing diagram illustrating the timing for the circuit of FIG. 5A for the operating condition where there are missing AC cycles and the AC voltage recovers at a 90 degree phase angle near its peak.

FIG. 6A shows the preferred embodiment of the present invention that provides active inrush current control that meets inrush current limit requirements in all operating conditions.

FIG. 6B shows a timing diagram illustrating the operation of the circuit in FIG. 6A for the operating condition where there are missing AC cycles and the AC voltage recovers at a 90 degree phase angle near its peak.

DETAILED DESCRIPTION OF THE INVENTION

The present invention comprises a circuit and corresponding method which provides control to limit inrush current during cold startup, hot startup and power line disturbance conditions in AC to DC power converters. The present invention overcomes the drawbacks of the known circuits and methods. The present invention will now be described in further detail.

FIG. 6A shows a circuit diagram of the preferred embodiment of an AC-DC power converter 100 according to the present invention. The inrush control circuit for power converter 100 is identified at 110. Converter 100 includes a bridge rectifier 94, a boost converter 120, inrush control circuit 110, and additional control circuitry as shown in FIG. 6A. Converter 100 is operatively connected between an AC input voltage (shown appearing across terminals ACL and ACN) from an AC voltage source (not shown) and an DC bulk output voltage appearing across terminals "Bulk+" and "Bulk−". The DC bulk output voltage is typically applied to the inputs of a DC—DC converter (not shown) to provide further regulation and/or voltage conversion. The AC input voltage is coupled to a bridge rectifier 94. The bridge rectifier 94 comprises diodes 37, 38, 42, and 43. The operation of bridge rectifier 94 is well known in the art. The bridge rectifier output is coupled to node 142 to provide rectified AC pulses to the circuit as shown. Node 142 is coupled to diode 35 and to the boost converter 120.

As shown in FIG. 6A, boost converter 120 is operatively connected between node 142 and capacitor 33. Boost converter 120 preferably includes an inductor 52, a diode 48 and a switch 98. Inductor 52 and diode 48 are connected in series between node 142 and the positive Bulk output voltage node terminal (Bulk+). Switch 98 is connected between a node, intermediate to inductor 52 and diode 48, and the negative bulk output voltage node terminal. In a preferred embodiment of the present invention, switch 98 is an n-channel MOSFET having a source, drain and gate. Switch 98 is controlled by application of a suitable waveform to its control gate. The gate drive signal, preferably controlled for Power Factor Correction (PFC), is provided for control of switch 98 of the boost converter 120. This gate drive signal is identified as "PFC Drive" in FIG. 6A. A suitable PFC control circuit may be used to provide the PFC Drive signal for achieving power factor correction (details not shown, PFC being well known to one of ordinary skill in the art).

The series combination of bulk capacitor 33 and inrush limit resistor 92 is connected across the DC bulk output voltage terminals. A switch 119 is coupled in parallel with inrush limit resistor 92. Switch 119 is preferably a MOSFET. Alternatively, a bipolar transistor, IGBT or any suitable semiconductor device may be used for switch 119. A resistor 108 is connected in series between inrush control circuit 110 and the gate of MOSFET switch. The inrush control circuit 110 will now be described in more detail.

The inrush control circuit 110 includes a comparator circuit preferably including five comparators (identified as 62, 64, 66, 102, and 114 in FIG. 6A) and additional control circuitry. The AC rectified pulses signal at node 142 is divided by a voltage divider formed by series resistors 63 and 65 to generate a sample of instantaneous AC voltage which is applied to the negative input of comparator 62. As is known in the art, the high AC voltage level and the corresponding DC bulk output voltage levels must be scaled down accordingly to provide signal levels suitable for comparison by standard comparator components. Similarly, for comparator 64 the AC rectified pulses signal at node 142 is divided by a voltage divider formed by series resistors 68 and 69 to generate a sample of instantaneous AC voltage which is applied to the positive input of comparator 64. The DC bulk output voltage is divided by a voltage divider formed by series resistors 67 and 61 to generate a representation of the bulk output voltage which is applied to the positive input of comparator 62.

A reference voltage, identified as "VRef" in FIG. 6A, is coupled to the negative input of comparator 66. VRef is also divided by a voltage divider formed by series resistors 71 and 73 and applied to the positive input of comparator 64 in order to define a threshold to set the Near Zero crossing detection for comparator 64. A suitable VRef level is chosen depending on the desired threshold and is preferably a 5V reference. Capacitors 72, 74, and 76 are connected in parallel with resistor 65, 61, and 69 respectively, for the filtering and decoupling of noise. The outputs of comparators 62 and 64 are connected at a node 82 which is coupled to the positive input for comparator 66.

An internal auxiliary converter (not shown) generates a bias voltage Vcc for the inrush control circuit 110 shown in FIG. 6A. Resistor 77 is connected in series between Vcc and node 82. The output of comparator 66 is connected to node 112. Resistor 122 in connected in series between Vcc and node 112. A parallel combination of diode 123 and resistor 126 couples the comparator 66 output to the positive input for comparator 114 at node 116. Node 116 is located at the junction of the positive input for comparator 114, the cathode of diode 123, resistor 126, and capacitor 115. Resistor 126, capacitor 115, and diode 123 form an RCD network for the positive input of comparator 114. Capacitor 115 couples node 116 to the negative bulk output voltage terminal to provide signal filtering. A resistor 124 is connected in series with a capacitor 113 between node 112 and the negative bulk output voltage terminal. The resistor 124 is connected in parallel with a diode 121 between node 112 and the positive input terminal of comparator 102 at node 144. Node 144 is located at the junction of the positive input for comparator 102, the anode of diode 121, resistor 124, and capacitor 113. A series combination of resistors 128 and 132 is coupled between the output of comparator 102 and the negative input of the comparator 114. Node 146 is located at the junction of the negative input of the comparator 114 and resistor 132, and is connected to VREF.

Inrush control circuit 110 in FIG. 6A also includes a transistor 118. Transistor 118 is preferably a pnp-type transistor having a base, emitter, and collector, though any suitable transistor can be used. Node 146 is connected to the emitter of a transistor 118. The junction of resistors 128 and 132 connects to the base of the transistor 118. A resistor 134 is connected in series between the collector of transistor 118 and a "PFC DRIVE OFF" node as shown in FIG. 6A. The signal at the "PFC DRIVE OFF" node provides hold off of the gate signal (gate signal shown preferably as PFC Drive in FIG. 6A) coupled to the gate of switch 98, thereby holding off switching of switch 98. A resistor 136 is connected in series between the output of comparator 114 and the VCC. The output of comparator 114, at node 148, is coupled to the resistor 108 which is connected to the gate of MOSFET switch 119 for switching control.

The operation of the active inrush current control of the present invention will now be described in further detail with reference to FIG. 6A. At initial power on, the entire controlled inrush current will pass through the diodes 37, 38, 42 and 43 of bridge rectifier 94, inductor 52, diode 48, capacitor 33 and inrush limit resistor 92. Alternatively, a bypass diode (not shown) may be connected across the series combination of inductor 52 and diode 48 to avoid saturation of inductor 52. Soon after initial power on, an internal auxiliary converter (not shown) starts up and generates the bias voltage Vcc for the inrush control circuit 110. Whenever AC cycles are missed in operating conditions due to power line disturbances, inrush control circuit 110 causes switch 119 to turn off. The bulk capacitor 33 will continue to hold up the bulk output voltage being fed to the DC—DC converter during the hold up period. Upon restoration of AC, a high inrush current can flow if the peak of the AC voltage is greater than the bulk output voltage at that point. However as the switch 119 is in off state, this current passes through bulk capacitor 33 and limiting resistor 92. Switch 119 is allowed to turn on only when favorable conditions are attained. Further details of the inrush control circuit 110 will now be discussed.

For the inrush control circuit 110, the comparators 62 and 64 set two conditions which must be satisfied to cause switch 119 to turn on. If the device used for switch 119 does not have a body diode as shown for the MOSFET shown in the preferred embodiment in FIG. 6A, an external diode must be connected across the device. Comparator 62 is connected such that the output is high for the condition wherein the instantaneous AC voltage at node 142 at the given time is lower than the bulk output voltage at that time. Comparator 64 is connected such that the AC rectified voltage at node 142 must be present and non-zero in order for the output to be set high (active). A non-zero detection threshold of 15V is preferred since it is readily sensed and does not affect the power factor and other performance since typically the PFC controlled boost converter stage becomes active at about a 35V level.

The operation of comparator 64 ensures that switch 119 always stays in the off state during missing cycle conditions, since at that time the AC input voltage is zero (not non-zero). Comparator 66 performs an AND operation such that its output goes high only when the above described conditions set by both comparators 62 and 64 are satisfied. In operation, a resistor 77 and capacitor 111 provide a small delay at the inputs to comparator 66. This delay is introduced in order to eliminate a race condition at the inverting and non-inverting pins of comparator 62 when AC voltage restores at a 90 degree phase and at very high dV/dT.

During a missing cycle, the condition set by comparator 64 is not satisfied and thus the output of comparator 66 goes low. As a result, the output of comparator 102 goes low rapidly due to the RCD network comprising resistor 124, capacitor 113, and diode 121 connected at the non inverting input of comparator 102. Diode 121 has an anode connected to capacitor 113 and a cathode connected to the output of comparator 66. Because of this orientation of diode 121, the capacitor 113 discharges quickly whenever the output of comparator 66 goes low. As a result, the PNP transistor 118 becomes forward biased and the 5V high VRef signal is developed at its collector. This signal at the collector of transistor 118 is coupled to the PFC DRIVE OFF node as shown in FIG. 6A for use in holding off the PFC Drive signal which in turn holds off switching of switch 98. Different signals can be developed from the basic signal from the collector of transistor 118 in order to turn OFF the boost converter stage, depending upon the particular control circuit used for control of the PFC Drive signal.

The parallel combination of diode 123 and resistor 126 are connected in series between the output of comparator 66 and the positive input of comparator 114. Diode 123 has an anode connected to comparator 66 and a cathode connected to the positive input of comparator 114. Thus, diode 123 is oriented opposite to diode 121 with respect to the output of comparator 66 and their respective comparator inputs. When the output of comparator 66 goes low, capacitor 115 will discharge after some time predetermined by the values of resistor 126 and capacitor 115. The output of comparator 114 then goes low, turning off the switch 119. The inrush control circuit thus ensures that the PFC Drive is switched off (holding off switch 98 of the boost converter 120) before switch 119 turns off.

When the AC voltage restores at a non zero angle, e.g. 90 degree phase angle near its peak, comparator 62 will not permit the drive of either the switch 98 or the switch 119 to go high unless the instantaneous AC voltage on the rectified pulse at node 142 falls below the bulk output voltage level. When this condition has not occurred, the switch 119 is off and the current that flows through the bulk capacitor 33 is controlled by series limiting resistor 92. The DC to DC converter (not shown) can then draw power directly from the bridge rectifier 94 to continue its operation. When instantaneous AC level does fall below the bulk level, output of comparator 66 goes high. Due to the configuration of the input RCD networks for both comparator 102 and comparator 114, the present invention ensures that the output of comparator 114 goes high first, turning on the switch 119 before the output of comparator 102 goes high. At that time, no current flows through switch 119 because the bridge rectifier 94 is reverse biased. After a short delay determined by the RCD network for the input to comparator 102, the comparator 102 output goes high which results in the PFC DRIVE OFF signal causing removal of the hold off on the PFC Drive signal, thus enabling switch 98 of the boost converter to be switched on. The present invention has the advantage of eliminating the large surge in voltage seen on the bulk capacitor 33 in Trace C in FIG. 5B for the circuit shown in FIG. 5A. Once the hold off on the PFC drive is removed, normal operation of the converter is restored.

FIG. 6B shows a timing diagram illustrating the operation of the circuit in FIG. 6A for the operating condition where there are missing AC cycles and the AC voltage recovers at a 90 degree phase angle near its peak. For FIG. 6B, Trace F represents the rectified AC pulses; Trace G is the input current; Trace H is the bulk output voltage; Trace I is the gate control signal for switch 98 (preferably the PFC Drive signal); and Trace J is the gate drive signal for switch 119. As can be seen in FIG. 6B, the circuit has the advantage of eliminating the bump (surge) for the bulk output voltage as shown in Trace H, in contrast to the surge shown in Trace C of FIG. 5B for the prior art circuit shown in FIG. 5A.

Consequently, the present invention has the advantage that inrush current is controlled both for hot startup, cold startup, and power line disturbance conditions. The present invention achieves this control while eliminating the need for an extra series dissipative device, and its consequent additional losses, and eliminating undesirable bumps and surges to the voltage input to the DC—DC converter. As the inrush current limiting resistor and the device which shunts it, are placed in series with the bulk capacitor, the current stress is the same as for the bulk capacitor. This stress is much smaller than the input current. Thus, the dissipation is lower compared to placing the device in series with the input as in the known methods. Due to the logic used to control the inrush current control switch, the control circuit can provide control even during operating conditions such as power line disturbances and provide inrush current control to meet the demanding requirements for present high power AC to DC converters. The present invention provides control of inrush current at cold and hot start as well as during operating conditions. The present invention can be used in all AC-DC converters, with or without power factor correction

What is claimed is:

1. An AC to DC power converter having active inrush current control during operational and power disturbance conditions, said converter having two input terminals to which AC power is coupled and two output terminals where the output DC power is provided, comprising:
   an input rectifier for generating a rectified input voltage from a source of said AC power;
   a boost converter coupled to said rectifier for converting said input voltage to a DC voltage, said boost converter having a first switch, an inductor, and a first diode;
   an output capacitor connected to a first one of said DC output terminals;
   a resistor connected in series between said output capacitor and a second one of said DC output terminals;
   a second switch having a control input and being connected in parallel with said resistor;
   a control circuit for controlling inrush current, said control circuit being operatively connected to said control input of said second switch, comprising:
      a comparator circuit for comparing the AC input and DC output voltages of the converter for causing said second switch to enter a conduction state when said AC input voltage exceeds a predetermined threshold and said AC input voltage is less than the DC output voltage.

2. The converter of claim 1, wherein said rectifier is a diode bridge.

3. The converter of claim 1, wherein said control circuit further comprises a circuit for causing said second switch to be prevented from entering a conduction state.

4. The converter of claim 3, wherein said control circuit further includes a timing circuit for switching said first switch to the off state before said second switch is switched to the off state.

5. The converter of claim 4, wherein said timing circuit further includes logic for setting said first switch to an off state and holding said first switch in the off state until said second switch is triggered to the on state.

6. The converter of claim 1, wherein said second switch is an IGBT, said converter further comprising a second diode connected across said second switch.

7. The converter of claim 1, wherein said second switch is a MOSFET, having a source, drain, gate and a body diode.

8. The converter of claim 1, wherein said second switch is a bipolar transistor, said converter further comprising a second diode connected across said second switch.

9. An AC to DC power converter having active inrush current control during operational and power disturbance conditions, said converter having two input terminals to which AC power is coupled and two output terminals where the output DC power is provided, comprising:
- a diode bridge rectifier for generating a rectified input voltage from a source of said AC power;
- a boost converter coupled to said rectifier for converting said input voltage to a DC voltage, said boost converter having a first switch, an inductor and a diode;
- an output capacitor connected to a first one of said DC output terminals;
- a resistor connected in series between said output capacitor and a second one of said DC output terminals;
- a second switch having a control input and being connected in parallel with said resistor;
- a control circuit for controlling inrush current, said control circuit being operatively connected to said control input of said second switch, said control circuit comprising:
  - a first comparator for comparing the instantaneous AC input voltage to the DC output voltage of the converter, said first comparator having an output set high when the instantaneous AC voltage is lower than the DC output voltage;
  - a second comparator for comparing the instantaneous AC input voltage to a predetermined voltage level, said second comparator having an output set high when the instantaneous AC input voltage is present and above said predetermined level;
  - a third comparator coupled to the outputs of said first comparator and said second comparator; such that the output of said third comparator is high when the output of said first and second comparators are both high;
  - wherein said output of said third comparator is connected to said control input of said second switch such that said second switch enters a conduction state when said third comparator output is high.

10. The converter of claim 9, wherein said control circuit further comprises:
- a fourth comparator;
- a first RCD network coupled between said third comparator and said fourth comparator for providing a first predetermined delay time;
- a fifth comparator;
- a second RCD network coupled between said third comparator and said fifth comparator for providing a second predetermined delay time;
- wherein said first and second RCD networks are selected so as to delay a high output of said fifth comparator until after a high output of said fourth comparator, such that said second switch is triggered before said first switch, such that voltage surges at the DC output are prevented; and
- a transistor having a base, collector, and emitter, coupled between said fourth and fifth comparators, said base of said transistor is coupled to the output of said fourth comparator, and the collector of said transistor is coupled to said control input of said first switch for maintaining said switch in an off state.

11. A method of controlling inrush current in a AC-DC converter when AC power is lost during power line disturbance conditions, wherein the AC to DC converter is coupled between two input terminals to which AC power is coupled and two output terminals where the DC output voltage is provided, the AC-to DC converter including a boost converter controlled by a first switch, the AC to DC converter having connected across the output terminals a capacitor connected in series with the combination of a limiting resistor connected in parallel with a second switch, comprising the steps of:
- a) maintaining said second switch in an off state to enable said limiting resistor to limit inrush current when said AC power is lost for a predetermined time interval;
- b) comparing the instantaneous AC input voltage to the DC output voltage of the converter;
- c) comparing the instantaneous AC input voltage to a predetermined voltage level to determine if the AC input voltage is present and non-zero; and
- d) triggering said second switch to the on state to shunt said limiting resistor when said AC power is restored to said predetermined level and the instantaneous input AC voltage is less than the DC voltage at the output of the AC-DC converter, such that inrush current is controlled and voltage surges at said DC output terminals are eliminated.

12. The method of claim 11, wherein the AC-DC converter includes a power factor control circuit for controlling said first switch of said boost converter, comprising the further step between steps c) and d) of:
- c1) triggering said first switch in the off state.

13. The method of claim 12, comprising the further step:
- e) maintaining said first switch in an off state for a predetermined time after said second switch is switched to the on state, such that voltage surges are prevented at the DC output.

* * * * *